Patented Jan. 9, 1923.

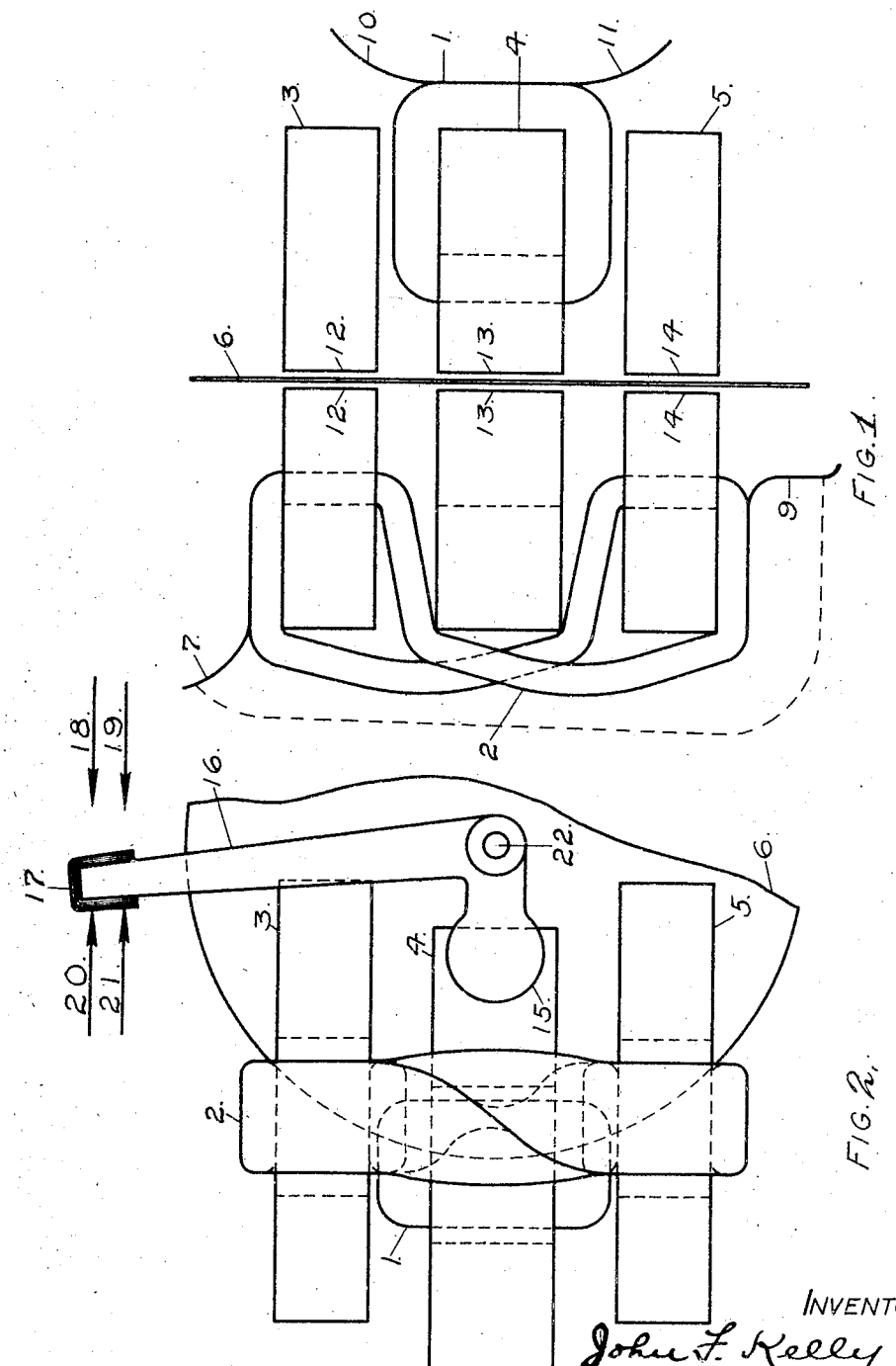

1,441,429

UNITED STATES PATENT OFFICE.

JOHN F. KELLY, OF TROY, NEW YORK, ASSIGNOR TO FEDERAL SIGNAL COMPANY, A CORPORATION OF NEW YORK.

ALTERNATING-CURRENT INDUCTION MOTOR.

Application filed July 21, 1916, Serial No. 110,529. Renewed September 18, 1922. Serial No. 589,014.

*To all whom it may concern:*

Be it known that I, JOHN F. KELLY, a citizen of the United States of America, residing at the city of Troy, in the county of Rensselaer and State of New York, have invented certain new and useful Improvements in Alternating-Current Induction Motors, of which the following is a specification.

My invention relates to induction motors, and the object of my invention is to provide an induction motor of the two element type operating either on two phases or in a single phase split in any of the well-known ways, and particularly such motors applied to relays for control of circuits such as are used for signaling purposes; together with such other elements and combinations as are hereinafter more particularly set forth and claimed.

I accomplish these objects by means of the mechanism illustrated in the accompanying drawings in which:

Fig. 1 is a partial view of an induction type relay and motor illustrating my method of placing and winding the fields.

Fig. 2 is a side view of Fig. 1.

Similar numbers refer to similar parts throughout the several views.

The two element type of motor is used for operating these relays to get a more efficient operating device and to make its control more flexible. As an example of this take such a relay used in connection with a track circuit where the two rails of the track are used for transmitting the power to one element; on account of their proximity to the ground the rails make a very poor transmission line so that the power to be transmitted is kept as low as possible. The other element of the motor is energized locally and it usually takes the greater part of the power necessary for the operation of the relay. By being biased either by counterweights or springs, these relays have a predetermined position to which they return when either element is deenergized. Such a relay could be returned to its biased position by deenergizing either element of the motor, or the motor direction might be changed by changing the polarity of the current in either element of the motor with respect to the current in the other element. Usually one element of the motor is continuously energized and the relay control is affected by changing the current in the other.

In the construction of such motors, it has heretofore been the practice to arrange the iron in the magnetic circuit and the energizing coils of one element in symmetrical relation to the iron in the magnetic circuit and the energizing coils of the other element, the coils being made up independently for the different poles of the magnetic circuits. This practice being that in use in the manufacture of the ordinary induction motors of commerce which are designed for continuous running and to have all its elements deenergized to stop its rotation.

It has been found that when such motors are applied to relays for signaling purposes and where, as stated above, they are controlled by deenergizing one element only, it is possible to have a short circuit on one or more coils of either element in such a way that the power in one element will tend to cause a rotation of the moving parts of the motor, even though the other element is deenergized. When used in connection with signal apparatus this unwarranted motion might give a "false clear" and is obviously an unsafe condition and it is the purpose of my invention to overcome this unsafe condition.

My invention consists of arranging the coils of the different elements of the motor so that even though one or more coils break down or are short circuited, a wrongful torque will not be exerted by the energization of one element only.

Referring to the drawings, 1 represents the energizing coil of the "main" or locally energized element and 4 represents the iron laminations which form the magnetic circuit of that element. 2 is the energizing coil of the "line" or controlled element and 3 and 5 are the iron laminations which form the magnetic circuit of that element. It will be seen that the coil 2 is made to surrround and energize both of the magnetic circuits 3 and 5.

6 is a disc or "rotor" of conducting, non-magnetic material, preferably aluminum or copper, and forms the moving element of the motor.

7 and 9 are wires carrying electric current to and from the energizing coil 2 of the controlled element; and 10 and 11 are wires carrying current to and from the energizing coil 1 of the main element. 12, 12 and 14, 14, are the pole faces of the controlled element magnetic circuit, and 13, 13, are the pole faces of the local element. 15, is a counterweight to bias the disc, 6. 16, is an arm attached to the disc, 6, carrying and insulated from contact piece, 17, which is made to close contacts, 18 and 19, when both elements of the motor are energized, or contacts, 20 and 21, when the motor is deenergized, which latter position is the position that the moving parts of the relay are biased to take. 22, is the center about which the disc, 6, counterweight, 15, and arm, 16, revolve.

I will now briefly describe the operation of this relay and point out the application of my invention thereto:—The circuit of the main element winding is as follows:

From an external source of alternating current energy through wire, 10, to coil, 1, to wire, 11, to the other side of the external source. This current in coil, 1, sets up a magnetic flux in the laminations, 4. This flux goes through the disc, 6, at the pole faces, 13, 13, setting up local currents in the disc, 6, in the proximity of pole faces, 13, 13. The circuit of the controlled element is as follows:

From an external source of alternating current energy through wire, 7, to coil, 2, through wire, 9, to the other side of the external source. The current in coil, 2, sets up flux in the iron laminations, 3 and 5, which passes through the disc, 6, at pole faces, 12, 12, and 14, 14, setting up local current in the disc, 6, in the proximity of pole faces, 12, 12 and 14, 14. On account of the phase difference between the currents in the coils, 1, and the currents set up in the disc, 6, by the flux in the main or local element reacts on the flux set up in the line or controlled element and conversely the currents in the disc, 6, set up by the flux in the line or controlled element are made to react on the flux in the local or main element. This reaction of the currents in the disc, 6, upon the fluxes threading the disc, 6, causes the disc, 6, to rotate, lifting the counterweight, 15, and carrying arm, 16, with its contacting piece, 17, away from contacts, 20 and 21, and bringing contact piece, 17, up against contacts, 18 and 19. This latter position of the contact arm is called the energized position of the relay.

It will be seen that if the coils are intact when the current is cut off either element there will no longer be a reacting of currents and fluxes in the disc, 6, therefore there will be no torque exerted and the counterweight, 15, will bring the disc, 6, to its biased position, breaking contacts, 18 and 19, bridging contacts, 20 and 21. This is the normal operation of the relay.

It will now readily be seen that if the coil 2 is made to surround the magnetic circuits 3 and 5 which comprise the line or controlled element that a short circuit, for instance, from wire, 7, to 9, will have the same effect on the different parts, 3 and 5, of the magnetic circuits of the line element so that there will be no unbalacing of the flux or currents in the disc, 6, and, therefore, no torque set up in the disc, 6, tending to rotate it.

It is obvious that the application shown is only typical and may be enlarged upon or made to cover conditions where the magnetic circuit of the main element also might be divided into several parts, or various other combinations that might arise.

What I claim as my invention and desire to secure by Letters Patent is:

1. In a two phase alternating current induction motor, a rotor biased to one position, a stator comprising a main field core and auxiliary field cores placed on opposite sides of said main field core, an energizing coil surrounding said main field core, and a second energizing coil surrounding said auxiliary field cores.

2. In a two phase alternating current induction motor, a rotor biased to one position, a stator comprising a main field core and auxiliary field cores placed on opposite sides of said main field core, an energizing coil surrounding said main field core, and a second energizing coil surrounding said auxiliary field cores in such manner that current passing therethrough will pass around one of said auxiliary field cores in counter direction to that in which it passes around the other of said auxiliary field cores.

In testimony whereof I have affixed my signature in presence of two witnesses.

JOHN F. KELLY.

Witnesses:
 BEULAH CARLE.
 FREDERICK W. CAMERON.